US009916096B2

(12) United States Patent
Bachar et al.

(10) Patent No.: US 9,916,096 B2
(45) Date of Patent: Mar. 13, 2018

(54) INCREASING DATA STORAGE CAPACITY

(71) Applicant: International Business Machines Corporation, Armonk, NY (US)

(72) Inventors: Yariv Bachar, Kibbutz Ma'abarot (IL); Ron Edelstein, Tel-Aviv (IL); Alon Horowitz, Tel-Aviv (IL); Oded Sonin, Omer (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 224 days.

(21) Appl. No.: 14/173,209

(22) Filed: Feb. 5, 2014

(65) Prior Publication Data

US 2015/0220272 A1  Aug. 6, 2015

(51) Int. Cl.
*G06F 3/06* (2006.01)

(52) U.S. Cl.
CPC .......... *G06F 3/0608* (2013.01); *G06F 3/0604* (2013.01); *G06F 3/067* (2013.01); *G06F 3/0631* (2013.01); *G06F 3/0644* (2013.01); *G06F 3/0647* (2013.01)

(58) Field of Classification Search
CPC ........................... G06F 12/0246; G06F 3/0644
See application file for complete search history.

(56) References Cited

U.S. PATENT DOCUMENTS

| 8,055,839 | B2 | 11/2011 | Kishi et al. | |
|---|---|---|---|---|
| 2006/0129779 | A1* | 6/2006 | Cannon | G06F 3/0605 711/170 |
| 2007/0073988 | A1* | 3/2007 | Shibayama et al. | 711/165 |
| 2007/0113007 | A1* | 5/2007 | Murayama et al. | 711/114 |
| 2013/0024640 | A1 | 1/2013 | Reed et al. | |
| 2014/0189272 | A1* | 7/2014 | Shin | G06F 3/0619 711/162 |
| 2014/0281337 | A1* | 9/2014 | Fujita et al. | 711/170 |
| 2014/0304451 | A1* | 10/2014 | Shibayama et al. | 711/103 |

* cited by examiner

*Primary Examiner* — Ryan Bertram
*Assistant Examiner* — Trang K Ta
(74) *Attorney, Agent, or Firm* — Griffiths & Seaton PLLC

(57) ABSTRACT

For increasing data storage capacity using a processor device, increasing logical capacity of data storage having a multiplicity of storage units containing fixed partitioned segments by moving a selected number of the fixed partitioned segments in one or more storage units to a reserved storage unit.

17 Claims, 4 Drawing Sheets

INCREASING DATA STORAGE CAPACITY

BACKGROUND OF THE INVENTION

Field of the Invention

The present invention relates in general to computers, and more particularly to increasing data storage capacity using a processor device in a computing environment.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components.

Within the computing environment, system resources may be required to perform a variety of operations and services, along with operating multiple applications while providing sufficient storage capacity. Performance and capabilities of software applications are often bounded by the physical resources allocated to that software. The challenge in such systems is provide sufficient storage capacity and further increase the capacity while allowing the application to continue to grow and expand without limitations to the physical storage capacities.

SUMMARY OF THE DESCRIBED EMBODIMENTS

In one embodiment, a method is provided for increasing data storage capacity using at least one processor device in a computing environment. In one embodiment, by way of example only, least one processor device increases increasing logical capacity of data storage having a multiplicity of storage units containing fixed partitioned segments by moving a selected number of the fixed partitioned segments in one or more storage units to a reserved storage unit.

In another embodiment, a computer system is provided for increasing data storage capacity using at least one processor device, in a computing environment. The computer system includes a computer-readable medium and a processor in operable communication with the computer-readable medium. In one embodiment, by way of example only, the processor, increases increasing logical capacity of data storage having a multiplicity of storage units containing fixed partitioned segments by moving a selected number of the fixed partitioned segments in one or more storage units to a reserved storage unit.

In a further embodiment, a computer program product is provided for increasing data storage capacity using at least one processor device, in a computing environment. The computer-readable storage medium has computer-readable program code portions stored thereon. The computer-readable program code portions include executable portions that increases increasing logical capacity of data storage having a multiplicity of storage units containing fixed partitioned segments by moving a selected number of the fixed partitioned segments in one or more storage units to a reserved storage unit.

In addition to the foregoing exemplary method embodiment, other exemplary system and computer product embodiments are provided and contribute related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
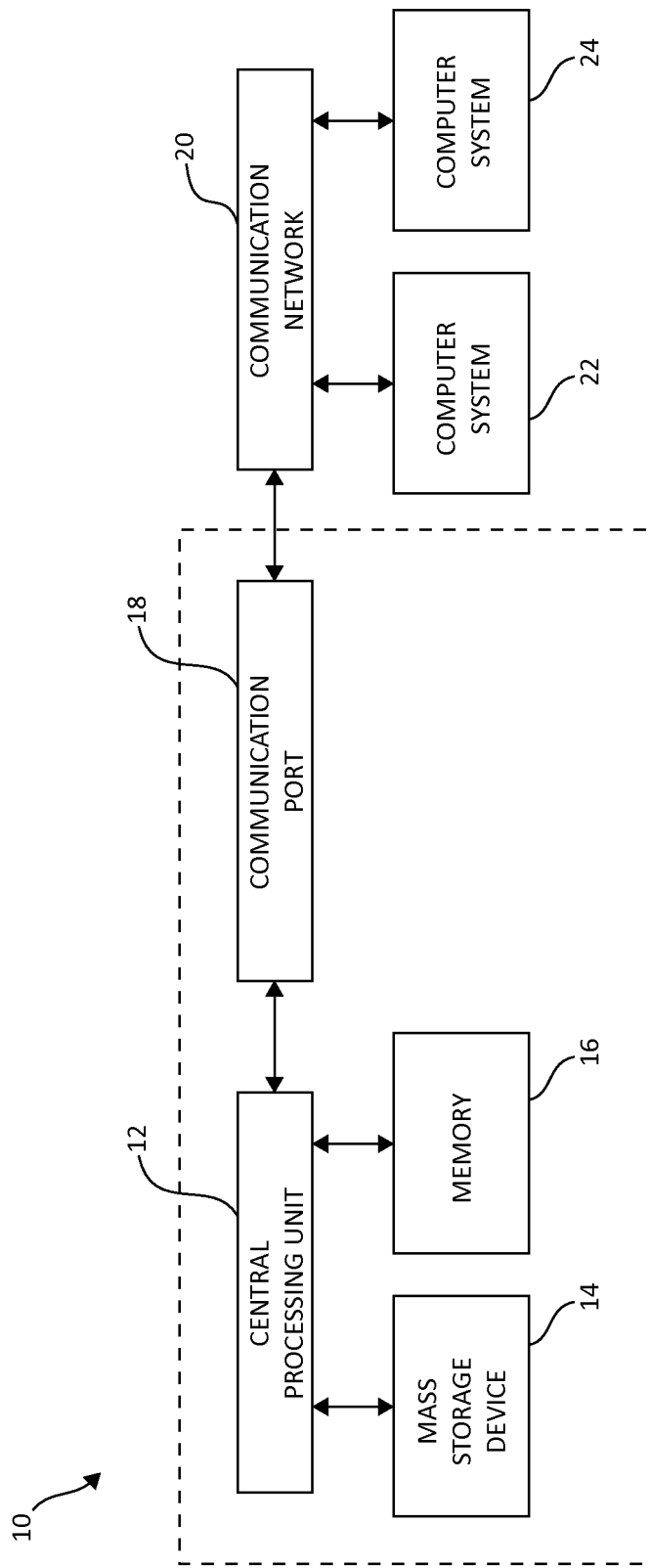
FIG. 1 illustrates a computer storage environment having an example storage device in which aspects of the present invention may be realized.

Throughout the following description and claimed subject matter, the following terminology, pertaining to the illustrated embodiments, is described. The definitions may form a table of suitable of definitions, form various representations of mathematical equations for suitable purposes if needed, form matrices for suitable purposes if needed, and for certain terms used herein.

An "L" is intended herein to represent an application's data logical size.

A "P" is intended herein to represent an application's data physical representation size.

An "L2P" (per client) is intended herein to represent a function that converts from the application's logical size to the application's physical representation. L2P is linear so that L2P(L) equals (=) A×L+B for some A,B.

A "$L_{max}, L_{min}$" is intended herein to be a maximal and minimal logical size that the application supports.

An "nSegmentsInStu" is intended herein to be a number of segments that are currently placed in each used storage unit.

An "nSegments" is intended herein to be a number of segments.

A "ROUND_UP(x, y)" is intended herein to be a function that rounds-up "x" so it can it be divided by "y", where x and y are some variable.

A "ROUND_UP_POWER2 (x)" is intended herein to be a function that rounds-up "x" to the closest power of 2.

A "ROUND_DOWN_POWER2(x)" is intended herein to be a function that rounds-down "x" to the closest power of 2.

A "used storage unit" is intended herein to be a storage unit that is currently being used by an application for its physical data representation.

A "reserved storage unit" is intended herein to be a storage unit that was allocated for an application but is not currently being used by the application.

A "reserved storage unit pool" is intended herein to be a pool of storage units that were allocated for an application but is not currently being used by the application.

As mentioned above, performance and capabilities of applications (e.g., software applications) are bounded by the physical resources allocated to that particular application. Specifically, applications may be limited by physical storage capacity allocated to the applications. In these cases, once the physical storage is exhausted the application is unable to grow any further until an increase capacity procedure is performed, in which the physical storage space is increased. Applications that utilize the system's physical storage define the physical representation of their data by way in which the application's logical data is structured on disk. The relationship between logical size and the size of its representation on disk is linear, as seen with the following equation:

$$\text{physical\_size} = A * \text{logical\_size} + B \text{(for some } A, B\text{)} \quad (1),$$

where physical_size is the physical size and the logical_size is the logical size, and A and B are variables.

In these cases, it is a reasonable requirement that when the application is required to support an additional logical size, the relationship between the additional logical size required and the additional physical size required will also be linear, as seen with the following equation:

$$\text{additional\_physical\_size} = C * \text{additional\_logical\_size} + D \text{(for some } C, D\text{)} \quad (2),$$

where additional_physical_size is the additional physical size and the additional_logical_size is the additional logical size, and C and D are variables.

During an operation for increasing storage capacity, an application is provided with new units of storage (e.g. file-systems, mount-points, directories, etc.), to which it can extend the physical representation of its data. Applications may determine the size of the storage units that will be provided. This allocation will be static (e.g., once a storage unit is allocated to an application, it cannot be resized or withdrawn.) Thus, choosing a strategy in which storage units are requested by the application is important and should be carefully planned. To this end a solution is provide herein to structure the physical representation of an application using fixed partitioning.

In fixed partitioning, the physical representation is partitioned to a fixed number of equal-size segments. The size of each data segment is the total physical representation size divided by the number of data segments. This relationship between the physical representation and its segments persists throughout the lifetime of the application. The number of segments remains constant, so whenever the physical representation grows, all of the physical representation's segments grow with the physical representation at the same rate. In the context of storage requirement planning, each storage unit may accommodate one or more segments of the physical representation.

When increasing the storage capacity of applications that have fixed-partitioned physical representation, the existing partitioning to data segments is preserved when the physical representation is distributed to new storage units. In other words, a segment may be copied as a whole from one storage unit to another. However, a logical migration of data from one segment to another is not advisable, especially when compared to copying segments as a whole because logical migration between segments may entail a substantial amount of overhead in terms of disk and central processing unit (CPU) usage. Moreover, when copying whole segments, a system would only need to handle one segment at a time, while logical migration would involve multiple segments at a time. This proves to be crucial for applications that require high rate of data availability during the increase capacity procedure. As such, an increase-capacity strategy is described herein for increasing data storage capacity for applications with a fixed-partitioned physical representation, which are linearly related to the application's logical data size, within systems that only allow static allocation of new physical storage units. In so doing, the increase-capacity strategy and solution for applications with a fixed-partitioned physical representation, which are linearly related to the application's logical data size, within systems that only allow static allocation of new physical storage units, satisfies each of the following essential requirements: 1) the requested physical size and the increase in the logical representation must be linearly related, 2) existing storage units cannot be resized nor discarded, and 3) redistribution of the physical representation segments to the new storage units must preserve the existing partitioning to segments (e.g., segments may be moved from one storage unit to another, but logical migration of data should not occur).

First, an application will maintain a reserved storage unit pool, which will include storage units that were allocated but are still not in use by the application. During a procedure for increasing data storage capacity, the newly allocated storage units, requested by an application for increased capacity, will be added to the application's reserved storage unit pool. Next, segments from the used storage units may be copied, as a whole, to some of those storage units that are allocated to the reserved storage unit. At this point, those storage units that are allocated to the reserved storage unit that now contain the copied segments are removed them from the reserved pool and making (e.g., classifying) them used storage units.

Also, since fixed-partitioning is used, the physical representation is partitioned to equal-sized segments. The number of segments is constant throughout the lifetime of the application. The increase-capacity strategy may repeatedly move half of the segments between storage units, thus it is required that the number of segments will be a power of two. All requested storage units have a constant, predefined, size. The storage unit size will not change throughout the lifetime of the application. Since the storage unit size is fixed, and all segments have the same size, each used storage unit will accommodate the same number of segments. Equation 3 (the physical request size calculation formula) describes the amount of additional physical space that will be requested during an increase capacity procedure, in which the logical size of the application increases by the change in L (ΔL):

$$\text{request} = 2 * L2P(\Delta L) \quad (3).$$

It should be noted that Equation 3 describes an approximation of the exact size that will be requested. The actual requests have some dependency on previous requests and are rounded-up to the storage-unit size. Equation 8, below, describes how the request size is exactly calculated. Since multiplying a linear function by 2 maintains its linearity, and since the function L2P is linear, the requested physical size and the increase in the logical representation are linearly related.

The physical representation of the data is partitioned to equal-size segments.

The number of segments is a power of two which is described in Equation 4:

$$nSegments = \text{ROUND\_UP\_POWER2}\left(\frac{L_{max}}{L_{min}}\right), \quad (4)$$

and this number is constant throughout the lifetime of the application, and thus the partitioning is fixed. The size of each segment depends on the current logical size of the application, and is described in Equation 5 (the segment size determination formula):

$$segmentSize = \frac{L2P(L)}{nSegments}. \quad (5)$$

The storage unit size is the minimal physical representation size, which according to Equation 5 is also the largest size a single segment can ever reach. The storage unit size (stuSize) is described in Equation 6:

$$stuSize = L2P(L_{min}) = L2P(L_{max})/nSegments \quad (6),$$

The storage unit size is constant throughout the lifetime of the application, thus, all of the requested storage units will have the same size. Each storage unit will accommodate the same amount of segments. The number of segments in each storage unit is the largest power of two that would still allow a storage unit to accommodate the segments. It is described in Equation 7 (the number of segments in storage unit):

$$nSegmentsInStu = \text{ROUND\_DOWN\_POWER2}\left(\frac{stuSize}{segmentSize}\right). \quad (7)$$

During an increase capacity procedure, the amount of additional physical capacity that will be requested (e.g., requesting new storage units and/or increased physical size of the segments in one or more of the storage units) by the application for a new logical size $L_{NEW}$ is described in Equation (8), which is the actual physical request size:

newAllocation=ROUND_UP(MIN($L2P(L_{max}),2*L2P(L_{new})$),stuSize),
requestAllocation=newAllocation−currentAllocation (8), where currentAllocation is the current allocation of physical capacity.

It should be noted that no request can cause the allocated physical size to become larger than the maximum possible physical representation size. Also, in some cases, the increase capacity will not require any additional storage units, and thus, no operation will be performed. Such will be the case when the increase amount is very small (e.g., smaller than a segment resolution). The newly allocated storage units will be added to the reserved storage unit pool of the application, and segments can then be redistributed to them. In one embodiment, redistribution does not occur on every storage-unit allocation, but only when the currently used storage units cannot accommodate the segments that are assigned to them, as seen when the condition in Equation 9 applies (condition for segment redistribution formula):

$$segmentSize*nSegmentsInStu>stuSize \quad (9),$$

As previously stated, once the requested storage units are allocated, they are added to the application's reserved storage unit pool. Then, segments may be copied into the newly allocated storage units added to the reserved storage unit. Such redistribution of segments will only take place if the increase capacity procedure causes segments to overflow their storage units. In that case, half of the segments in each storage unit will be copied, as a whole, to a reserved storage unit pool until the storage units are able to accommodate the segments that are assigned to them. By redistributing segments, as a whole, to a reserved storage unit, no logical migration is performed. At no point will used storage units become empty following this increase-capacity procedure, thus no storage units are ever discarded.

For example, consider a storage-unit size is 16 megabytes (MB), segment size is currently 2 MB, and there are currently 8 segments in each storage unit. If an increase capacity procedure causes each segment's size to grow to 3 MB, a 16 MB storage unit will no longer be able to accommodate 8 segments with a total size of 8 segments multiplied by 3 MB to equal 24 MB (e.g., 8 segments*3 MB=24 MB). Thus, half of the segments in each storage unit will be copied to reserved storage units (e.g., reserved storage unit pool), and there will now be 4 segments in each storage unit, and the 16 MB storage unit will accommodate the segments size of 12 MB (e.g., four segments multiplied by 3 MB to equal 12 MB size segments, or 4×3 MB=12 MB size segments). A more detailed example is described below in FIG. 4. Hence, the described increase capacity strategy satisfies the requirements listed above by performing increase capacity is as follows. 1) Request additional storage units according to the formula that is described in Equation 8, and adds them to the application's reserved storage unit pool. 2) Check whether the currently used storage units can accommodate the segments that are assigned to the currently used storage units. 3) If the storage units can accommodate the segments, the procedure ends, otherwise 4) half of the segments in each storage unit are moved to a reserved storage unit(s). 5) The present invention will repeat the above steps 2-4 until the procedure ends.

Turning now to FIG. 1, exemplary architecture 10 of data storage systems (e.g., virtual tape systems) for resource allocation of resources for dual activities systems in a computing environment is depicted. The computer system 10 includes central processing unit (CPU) 12, which is connected to mass storage device(s) 14 and memory device 16. Mass storage devices may include hard disk drive (HDD) devices, solid-state devices (SSD) etc., which may be configured in a redundant array of independent disks (RAID). The backup operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 may be connected through communication port 18 to a communication network 20, having an attached plurality of additional computer systems 22 and 24.

Figure 2:
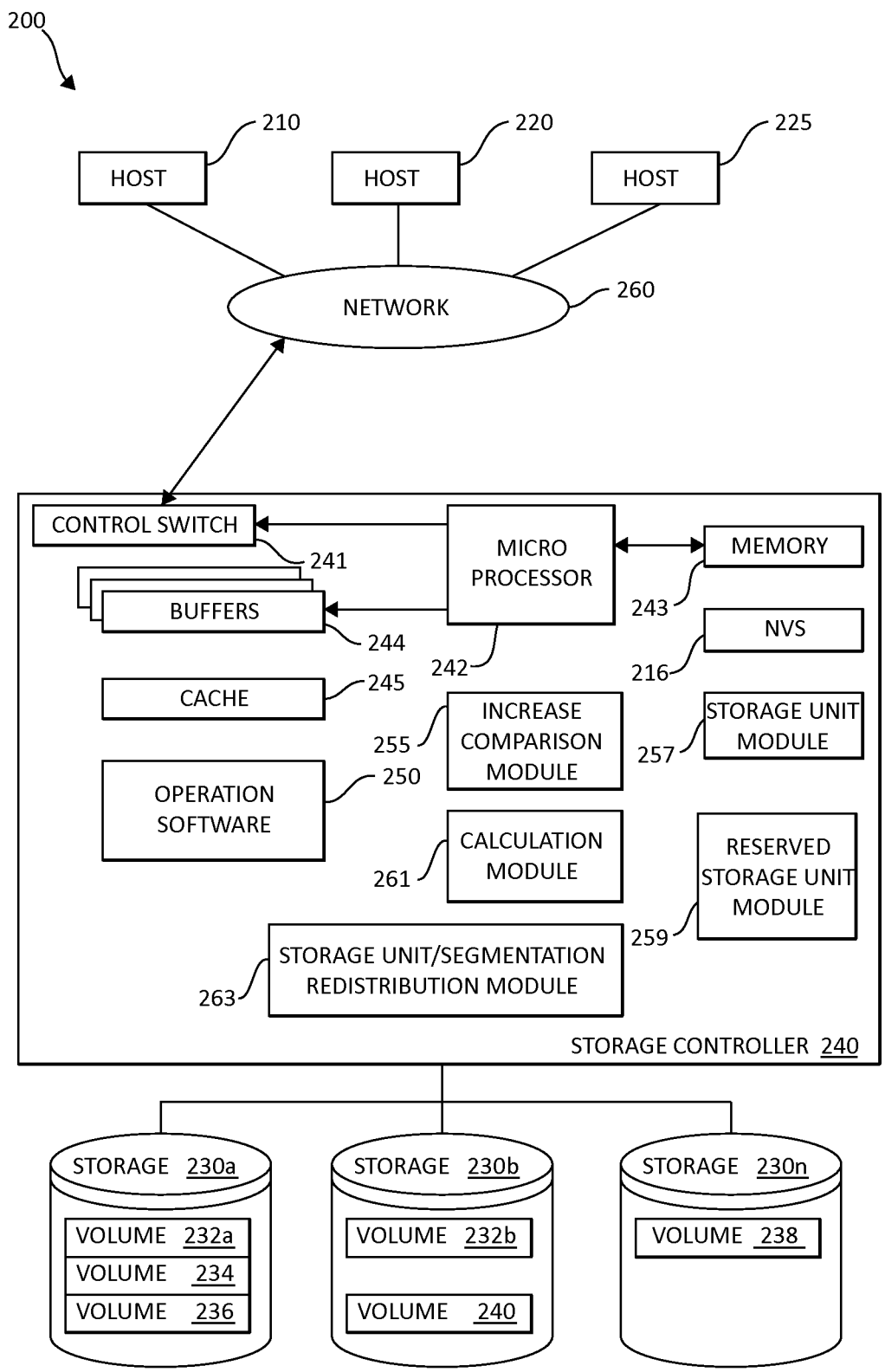
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® Protec-TIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 2) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a increase capacity module 255, a storage unit module 257, a reserved storage unit module 259, a calculation module 261, and a storage unit/segmentation redistribution module 263. The increase capacity module 255, the storage unit module 257, the reserved storage unit module 259, the calculation module 261, and the storage unit/segmentation redistribution module 263 may work in conjunction with each and every component of the storage controller 240, the hosts 210, 220, 225, and storage devices 230. The increase capacity module 255, the storage unit module 257, the reserved storage unit module 259, the calculation module 261, and the storage unit/segmentation redistribution module 263 may be structurally one complete module or may be associated and/or included with other individual modules. The increase capacity module 255, the storage unit module 257, the reserved storage unit module 259, the calculation module 261, and the storage unit/segmentation redistribution module 263 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the increase capacity module 255, the storage unit module 257, the reserved storage unit module 259, the calculation module 261, and the storage unit/segmentation redistribution module 263 in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, increase capacity module 255, the storage unit module 257, the reserved storage unit module 259, the calculation module 261, and the storage unit/segmentation redistribution module 263 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the increase capacity module 255, the storage unit module 257, the reserved storage unit module 259, the calculation module 261, and the storage unit/segmentation redistribution module 263 may also be located in the cache 245 or other components. As such, the increase capacity module 255, the storage unit module 257, the reserved storage unit module 259, the calculation module 261, and the storage unit/segmentation redistribution module 263 maybe used as needed, based upon the storage architecture and users preferences.

Figure 3:
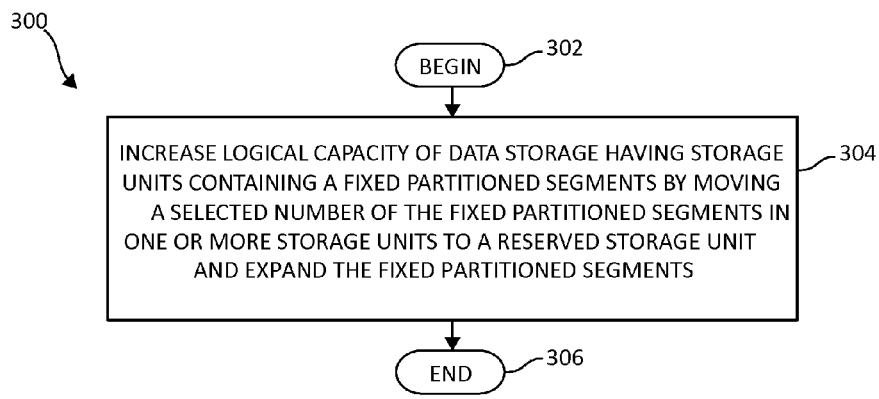
FIG. 3 is a flowchart illustrating an exemplary method for increasing data storage capacity in which aspects of the present invention may be realized.
Figure 4:
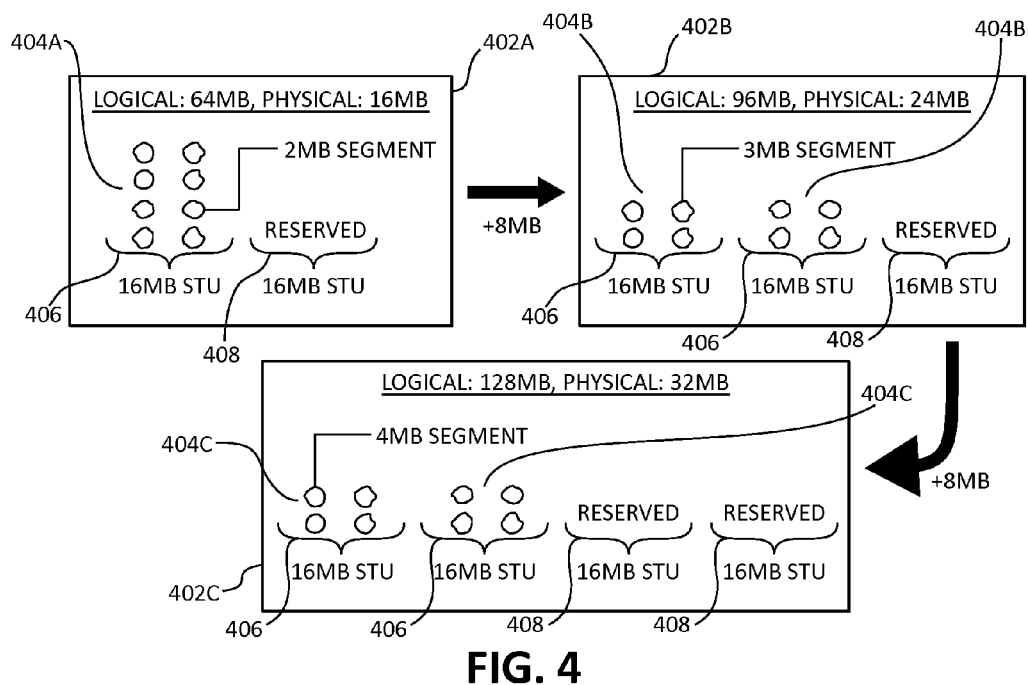
FIG. 4 illustrates an exemplary block diagram showing an increase in fixed-partitioned physical data storage capacity with a linear relation to logical data size in a computer system in which aspects of the present invention may be realized.
Figure 5:
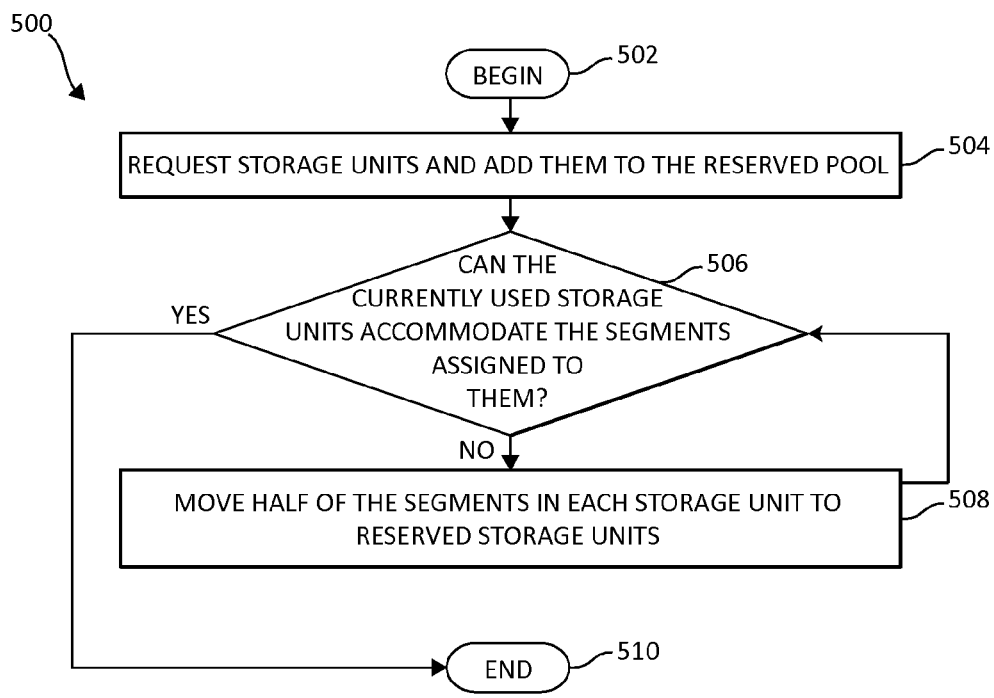
FIG. 5 is a flowchart illustrating an exemplary method for increasing fixed-partitioned physical data storage capacity with a linear relation to logical data size in which aspects of the present invention may be realized.

Using the descriptions and equations described herein, FIGS. 3-5 illustrate the operations for increasing data storage capacity, or more specifically, increasing fixed-partitioned physical data storage capacity with a linear relation to logical data size. More specifically, FIGS. 3-5 and the equations below, illustrate how fixed-partitioned physical data storage capacity having a linear relation to logical data size is increased.

Turning now to FIG. 3, a flowchart illustrating an exemplary method 300 increasing data storage capacity in which aspects of the present invention may be realized is depicted. The method 300 begins (step 302) by increasing logical capacity of data storage having storage units containing fixed partitioned segments by moving a selected number of the fixed partitioned segments from one or more of the storage units to a reserved storage unit(s) (which reserved storage unit is included in a reserved storage unit pool and has been previously allocated for an application but are not currently used by the application,) and expands the fixed partitioned segments (e.g., expands the fixed partitioned segments to a constant, equal, and predefined size) (step 304). The pool of reserved storage units has been previously reserved for one or more applications, and is maintained for one or more applications. The method 300 ends (step 306).

In order to preserve the invariant that the number of segments in each storage unit is the same, half of the segments in each used storage unit are moved—as a whole—to a reserved storage unit pool. Turning now to FIG. 4 and applying the various equations described herein, an exemplary block diagram 400 showing an increase in fixed-partitioned physical data storage capacity with a linear relation to logical data size is depicted. For example, FIG. 4 describes an application 402 (progressively shown as 402A, 402B, and 402C) in which L2P(L)=4 L. At first, the 16 MB physical representation is partitioned to 8 segments 404A of 2 MB. The physical data is then increased to 24 MB, which in turn increases each segment 404B to 3 MB, and thus a single storage unit (with each storage unit shown in the FIG. 4 as "STU") can no longer accommodate 8 segments 404A. Consequently, half of the segments 404 are copied to one of the reserved storage units 408 (e.g., a pool of reserved storage units). Then, the physical representation is increased again, to 32 MB as seen in 402C, which in turn increases each segment 404C to 4 MB. In this case, no copying takes place because the in-use storage units 406 can still accommodate 4 segments 404C of 4 MB each.

FIG. 5 is a flowchart illustrating an additional exemplary method 500 for increasing fixed-partitioned physical data storage capacity with a linear relation to logical data size. The method 500 begins (step 502) by requesting storage units to be added to a reserved storage unit (e.g., reserved pool) (step 504). The method 500 determines if the currently used storage units can accommodate each of the segments that are assigned to the currently used storage units (step 506). If no, the method 500 moves and/or redistributes half of the segments in each storage unit to one or more reserved storage units (step 508). If the currently used storage units can accommodate each of the segments that are assigned to the currently used storage units, the method 500 ends (step 510).

As described above, the logical capacity of data storage containing fixed partitioned segments is increased by moving selected ones of the segments to a previously reserved storage unit (e.g., a previously reserved storage unit in a reserved storage unit pool) and expands the segments. More specifically, newly allocated storage units are moved to the reserved storage pool during an increase-data storage capacity procedure (e.g, an operation for increasing data storage capacity). A number of segments are moved to the reserved storage pool in a power of two, since the physical representation is divided into an equal number of segments.

It should be noted that using reserved storage units is to facilitate an operation for increasing data storage capacity rather than facilitating write operations, and the present invention addresses a key requirement for increasing data storage capacity for an application by redistribution of the data without logical migration, and maintains linearity between the requested physical and logical representation sizes.

In summary, the present invention increases logical capacity of data storage having storage units containing fixed partitioned segments by moving a selected number of fixed partitioned segments of the storage units to a reserved storage unit and expands the fixed-partitioned segments (e.g., expands to a constant, equal, and predefined size). Reserved storage units (e.g., a pool of reserved storage units) have been previously reserved for one or more applications and are maintained for one or more applications. The fixed partitioned segments are moved in a power of two to the selected number of the storage units in the reserved storage pool since a physical representation of the data is divided into an equal number of segments.

A selected number of the storage units are allocated (and/or requested to be added) to the reserved storage unit during an increase logical capacity operation. The size of the request for the selected number of the storage units to be allocated during an increase logical capacity operation is calculated. The request includes taking into consideration previous requests.

If an increase capacity operation causes the one of the storage units to expand beyond a constant, predefined size of the fixed partitioned segments (e.g., the storage unit is not able to accommodate an increased capacity), a selected number of the fixed partitioned segments are redistributed, from one of storage units that is not included in the reserved storage unit pool, into at least one of the storage units included in the reserved storage unit pool. Each of the storage units partitioned into equally fixed sizes. The number of the segments are constant during a lifecycle of the application, but may be expanded. At least half of the selected number of the fixed partitioned segments are copied from any one of the storage units not included in the reserved storage unit pool and moved/copied into at least one of the storage units included in the reserved storage unit pool. In other words, the increase-capacity strategy ensures that each one of the storage units accommodate an equal amount of the fixed partitioned segments during an increase logical capacity operation. The number of the fixed partitioned segments in each one of the storage units is equal to a largest power of two that allows for accommodating the equal amount of the fixed partitioned segments. The storage units that now contain the selected number of the fixed partitioned segments that are copied into the storage units in the reserved storage unit are now removed from the reserved storage unit pool. The storage units are now considered as "used storage units" where they are now being used by the application.

In short, the increase-capacity strategy may perform each step: 1) request the selected number of the storage units to add to a reserved storage unit, 2) determine whether those of the storage units currently being used by the application can accommodate those of the fixed partitioned segments assigned to those of the storage units currently being used by the application, and/or 3) move half of the fixed partitioned segments into a reserved storage unit if those of the storage units currently being used by the application cannot accommodate those of the fixed partitioned segments assigned to the fixed partitioned segments.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, fieldprogrammable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for increasing data storage capacity using a processor device in a computing environment, the method comprising:

increasing logical capacity of data storage having a plurality of storage units containing a plurality of fixed partitioned segments by moving a selected number of the plurality of fixed partitioned segments in at least one of the plurality of storage units to a reserved storage unit;

maintaining the reserved storage unit for an application, wherein the reserved storage unit is a storage unit that has been previously allocated for the application but is not currently used by the application;

moving in a power of two the plurality of fixed partitioned segments to the reserved storage unit in a reserved storage unit pool; and allocating a selected number of the plurality of storage units to the reserved storage unit pool during an increase logical capacity operation, wherein the reserved storage unit pool comprises a pool of storage units allocated for the application, the application executing on a host in communication with a data storage system, that are not currently being used by the application.

2. The method of claim 1, further including calculating a size of a request for the selected number of the plurality of storage units to be allocated during an increase logical capacity operation, wherein the request includes taking into consideration previous requests.

3. The method of claim 1, further including performing at least one of:

redistributing into at least one of the plurality of storage units included in a reserved storage unit pool the selected number of the plurality of fixed partitioned segments from one of the plurality of storage units not included in the reserved storage unit pool if an increase capacity operation causes the one of the plurality of storage units to expand beyond a constant, predefined size of the plurality of fixed partitioned segments, copying into at least one of the plurality of storage units included in the reserved storage unit pool at least half of the selected number of the plurality of fixed partitioned segments from any one of the plurality of storage units not included in the reserved storage unit pool, and removing from the reserved storage unit pool the at least one of the plurality of storage units containing the selected number of the plurality of fixed partitioned segments that are copied.

4. The method of claim 1, further including ensuring that each one of the plurality of storage units accommodate an equal amount of the plurality of fixed partitioned segments during an increase logical capacity operation, wherein a number of the plurality of fixed partitioned segments in each one of the plurality of storage units is equal to a largest power of two that allows for accommodating the equal amount of the plurality of fixed partitioned segments.

5. The method of claim 1, further including partitioning each of the plurality of storage units into equally fixed sizes, wherein the number of the plurality of storage units are constant during a lifecycle of the application.

6. The method of claim 1, further including performing each one of:

requesting the selected number of the plurality of storage units to add to a reserved storage unit pool, determining whether those of the plurality of storage units currently being used by the application can accommodate those of the plurality of fixed partitioned segments assigned to the plurality of fixed partitioned segments, and moving half of the plurality of fixed partitioned segments into the reserved storage unit if those of the plurality of storage units currently being used by the application cannot accommodate those of the plurality of fixed partitioned segments assigned to the plurality of fixed partitioned segments.

7. A system for increasing data storage capacity in a computing environment, comprising:
   a data storage system;
   a plurality of storage units included in the data storage system;
   a plurality of fixed partitioned segments contained in the plurality of storage units;
   a reserved storage unit pool in the data storage system;
   a reserved storage unit in the reserved storage unit pool; and
   at least one processor device for controlling the data storage system, operable in the computing environment, wherein the at least one processor device:
      increases logical capacity of the data storage system having the plurality of storage units containing the plurality of fixed partitioned segments by moving a selected number of the plurality of fixed partitioned segments in at least one of the plurality of storage units to the reserved storage unit,
      maintains the reserved storage unit for an application, wherein the reserved storage unit is a storage unit that has been previously allocated for the application but is not currently used by the application,
      moves in a power of two the plurality of fixed partitioned segments to the reserved storage unit in a reserved storage unit pool, and
      allocates a selected number of the plurality of storage units to the reserved storage unit pool during an increase logical capacity operation, wherein the reserved storage unit pool comprises a pool of storage units allocated for the application, the application executing on a host in communication with the data storage system, that are not currently being used by the application.

8. The system of claim 7, wherein the at least one processor device calculates a size of a request for the selected number of the plurality of storage units to be allocated during an increase logical capacity operation, wherein the request includes taking into consideration previous requests.

9. The system of claim 7, wherein the at least one processor device performs at least one of:
   redistributing into at least one of the plurality of storage units included in a reserved storage unit pool the selected number of the plurality of fixed partitioned segments from one of the plurality of storage units not included in the reserved storage unit pool if an increase capacity operation causes the one of the plurality of storage units to expand beyond a constant, predefined size of the plurality of fixed partitioned segments,
   copying into at least one of the plurality of storage units included in the reserved storage unit pool at least half of the selected number of the plurality of fixed partitioned segments from any one of the plurality of storage units not included in the reserved storage unit pool, and
   removing from the reserved storage unit pool the at least one of the plurality of storage units containing the selected number of the plurality of fixed partitioned segments that are copied.

10. The system of claim 7, wherein the at least one processor device ensures that each one of the plurality of storage units accommodate an equal amount of the plurality of fixed partitioned segments during an increase logical capacity operation, wherein a number of the plurality of fixed partitioned segments in each one of the plurality of storage units is equal to a largest power of two that allows for accommodating the equal amount of the plurality of fixed partitioned segments.

11. The system of claim 7, wherein the at least one processor device partitions each of the plurality of storage units into equally fixed sizes, wherein the number of the plurality of storage units are constant during a lifecycle of the application.

12. The system of claim 7, wherein the at least one processor device performs each one of:
   requesting the selected number of the plurality of storage units to add to the reserved storage unit pool,
   determining whether those of the plurality of storage units currently being used by the application can accommodate those of the plurality of fixed partitioned segments assigned to the plurality of fixed partitioned segments, and
   moving half of the plurality of fixed partitioned segments into the reserved storage unit pool if those of the plurality of storage units currently being used by the application cannot accommodate those of the plurality of fixed partitioned segments assigned to the plurality of fixed partitioned segments.

13. A computer program product for increasing data storage capacity using a processor device, the computer program product comprising a non-transitory computer-readable storage medium having computer-readable program code portions stored therein, the computer-readable program code portions comprising:
   a first executable portion that increases logical capacity of data storage having a plurality of storage units containing a plurality of fixed partitioned segments by moving a selected number of the plurality of fixed partitioned segments in at least one of the plurality of storage units to a reserved storage unit;
   a second executable portion that maintains the reserved storage unit for an application, wherein the reserved storage unit is a storage unit that has been previously allocated for the application but is not currently used by the application; and
   a third executable portion that moves in a power of two the plurality of fixed partitioned segments to the reserved storage unit in a reserved storage unit pool; and
   allocates a selected number of the plurality of storage units to the reserved storage unit pool during an increase logical capacity operation, wherein the reserved storage unit pool comprises a pool of storage units allocated for the application, the application executing on a host in communication with a data storage system, that are not currently being used by the application.

14. The computer program product of claim 13, further including a fourth executable portion that calculates a size of a request for the selected number of the plurality of storage units to be allocated during an increase logical capacity operation, wherein the request includes taking into consideration previous requests.

15. The computer program product of claim 13, further including a fourth executable portion that performs at least one of:

redistributing into at least one of the plurality of storage units included in a reserved storage unit pool the selected number of the plurality of fixed partitioned segments from one of the plurality of storage units not included in the reserved storage unit pool if an increase capacity operation causes the one of the plurality of storage units to expand beyond a constant, predefined size of the plurality of fixed partitioned segments, copying into at least one of the plurality of storage units included in the reserved storage unit pool at least half of the selected number of the plurality of fixed partitioned segments from any one of the plurality of storage units not included in the reserved storage unit pool, and removing from the reserved storage unit pool the at least one of the plurality of storage units containing the selected number of the plurality of fixed partitioned segments that are copied.

16. The computer program product of claim 13, further including a fourth executable portion that performs at least one of:

ensuring that each one of the plurality of storage units accommodate an equal amount of the plurality of fixed partitioned segments during an increase logical capacity operation, wherein a number of the plurality of fixed partitioned segments in each one of the plurality of storage units is equal to a largest power of two that allows for accommodating the equal amount of the plurality of fixed partitioned segments, and partitioning each of the plurality of storage units into equally fixed sizes, wherein the number of the plurality of storage units are constant during a lifecycle of the application.

17. The computer program product of claim 13, further including a fourth executable portion that performs each one of:

requesting the selected number of the plurality of storage units to add to a reserved storage unit pool, determining whether those of the plurality of storage units currently being used by the application can accommodate those of the plurality of fixed partitioned segments assigned to the plurality of fixed partitioned segments, and moving half of the plurality of fixed partitioned segments into the reserved storage unit pool if those of the plurality of storage units currently being used by the application cannot accommodate those of the plurality of fixed partitioned segments assigned to the plurality of fixed partitioned segments.

* * * * *